United States Patent
Larignon

(10) Patent No.: US 11,070,975 B2
(45) Date of Patent: Jul. 20, 2021

(54) METHOD AND DEVICE FOR TRANSMITTING ENCRYPTED DATA, METHOD AND DEVICE FOR EXTRACTING DATA

(71) Applicant: SIGFOX, Labege (FR)

(72) Inventor: Guillaume Larignon, Labege (FR)

(73) Assignee: SIGFOX, Labege (FR)

( * ) Notice: Subject to any disclaimer, the term of this patent is extended or adjusted under 35 U.S.C. 154(b) by 126 days.

(21) Appl. No.: 16/347,589

(22) PCT Filed: Nov. 9, 2017

(86) PCT No.: PCT/EP2017/078809
§ 371 (c)(1),
(2) Date: May 5, 2019

(87) PCT Pub. No.: WO2018/087255
PCT Pub. Date: May 17, 2018

(65) Prior Publication Data
US 2019/0349754 A1 Nov. 14, 2019

(30) Foreign Application Priority Data

Nov. 9, 2016 (FR) ..................................... 16 60864

(51) Int. Cl.
*H04L 29/06* (2006.01)
*H04W 12/033* (2021.01)
(Continued)

(52) U.S. Cl.
CPC ......... *H04W 12/033* (2021.01); *H04L 9/0822* (2013.01); *H04L 9/0872* (2013.01);
(Continued)

(58) Field of Classification Search
CPC . H04L 9/0822; H04L 9/0872; H04L 63/0435; H04L 9/3242
See application file for complete search history.

(56) References Cited

U.S. PATENT DOCUMENTS 10,681,540 B2    6/2020  Takemori et al.
2006/0159260 A1* 7/2006  Pereira .................. H04L 9/0838
                                                              380/44
(Continued)

FOREIGN PATENT DOCUMENTS

EP   3 051 743 A1    8/2016
WO   2015/186825 A1  12/2015

*Primary Examiner* — Ellen Tran
(74) *Attorney, Agent, or Firm* — IM IP Law; Chai Im; C. Andrew Im

(57) ABSTRACT

A method for transmitting, by a transmitter, a packet to a receiver of a communication system. The packet including data encrypted according to a symmetric key encryption protocol by determining the value of a generation information and determining an encryption key according to the value of the generation information. The data to be included in the encrypted packet to be transmitted is encrypted according to the encryption key. A truncated information is calculated based on the generation information. A verification code for the encrypted packet is calculated according to the encrypted data and the first portion of the generation information. The encrypted packet to be transmitted is formed according to the truncated information, the verification code and the encrypted data.

20 Claims, 4 Drawing Sheets

Figure 1:
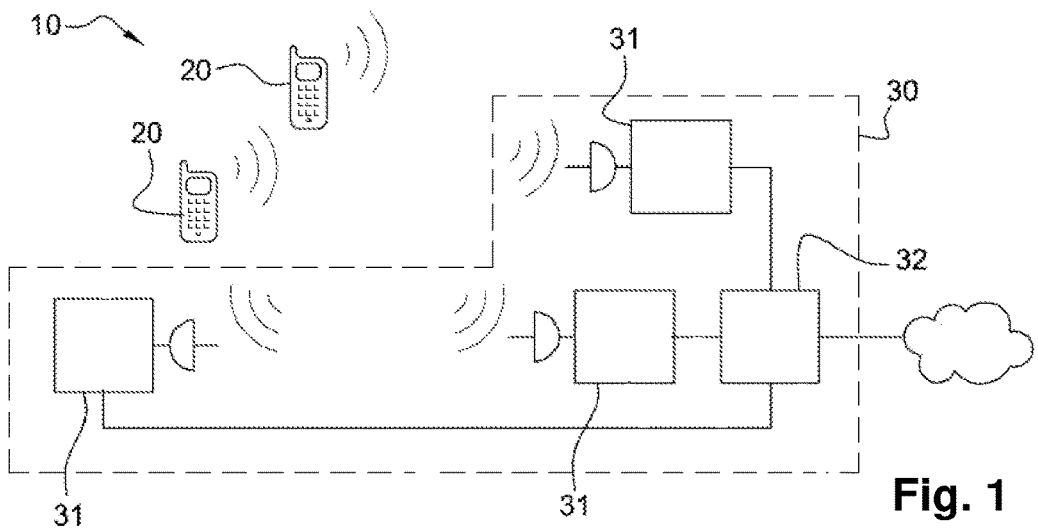

(51) Int. Cl.
*H04L 9/08* (2006.01)
*H04L 9/32* (2006.01)

(52) U.S. Cl.
CPC ........ *H04L 9/3242* (2013.01); *H04L 63/0435* (2013.01); *H04L 2209/80* (2013.01)

(56) References Cited

U.S. PATENT DOCUMENTS

| | | |
|---|---|---|
| 2009/0262937 A1 | 10/2009 | Hirth et al. |
| 2010/0098249 A1 | 4/2010 | Shin et al. |
| 2012/0039469 A1* | 2/2012 | Mueller ................. G06Q 20/12 380/252 |
| 2016/0242029 A1 | 8/2016 | Agiwal et al. |
| 2017/0055148 A1* | 2/2017 | Zimmerman ......... H04L 9/0877 |

* cited by examiner

METHOD AND DEVICE FOR TRANSMITTING ENCRYPTED DATA, METHOD AND DEVICE FOR EXTRACTING DATA

RELATED APPLICATIONS

This application is a § 371 application of PCT/EP2017/078809 filed Nov. 9, 2017, which claims priority from French Patent Application No. 16 60864 filed Nov. 9, 2016, each of which is incorporated herein by reference in its entirety.

TECHNICAL FIELD

The present invention relates to the field of digital telecommunications, and more particularly relates to a method for transmitting a packet comprising encrypted data, as well as a method for extracting data included in such a packet.

BACKGROUND OF THE INVENTION

The present invention has a particularly advantageous application, although in no way limiting, in the ultra narrow band wireless communication systems. The term "ultra narrow band" (UNB) means that the instantaneous frequency spectrum of the radio signals transmitted by terminals, to an access network, is of a frequency width less than two kilohertz, even less than one kilohertz.

Such UNB wireless communication systems are particularly suitable for applications of the M2M type (acronym for "Machine-to-Machine") or of the IoT type (acronym for "Internet of Things").

In such a UNB wireless communication system, the data exchanges take place primarily on an uplink from the terminals to an access network of said system.

The terminals transmit packets which are collected by base stations of the access network, without having to be associated beforehand with one or several base stations of the access network. In other terms, the packets transmitted by a terminal are not intended for a specific base station of the access network, and the terminal transmits its packets by supposing that they will be able to be received by at least one base station.

Such arrangements are advantageous in that the terminal does not need to take regular measurements, when are in particular intensive from an electrical energy consumption standpoint, in order to determine the base station that is most suitable for receiving its packets. The complexity is based on the access network, that has to be able to receive packets that can be transmitted at arbitrary instants, and over arbitrary central frequencies inside a multiplexing frequency bands of various terminals.

In many applications, it may be necessary to encrypt the data included in the packets, so as to ensure the confidentiality on the uplink between the terminals and the access network.

There are many encryption protocols. For example, in a symmetrical encryption key protocol, the same key is used to encrypt and to decrypt the data. Said key must consequently be known or be able to be determined both by the terminal that transmits the data, and by the access network that receives said data.

Furthermore, in order to improve the confidentiality of the exchanges, it is desirable to vary the key used over the course of time, for example at each new transmission of a packet.

In such a case, means must be provided in order to ensure that the terminal and the access network each use in turn the same key to respectively encrypt and decrypt the data.

For example, it is possible to change the key at each packet, according to a predefined key generation method known a priori to the terminal and to the access network. The access network, when it receives a packet, updates the key by applying the same key generation method as the terminal.

A disadvantage with such an approach is that, in a UNB wireless communication system, the access network does not necessarily receive all of the packets transmitted by the terminal, in such a way that the access network does not know a priori how many times the key has been modified between the preceding packet received from the same terminal and the current packet.

Alternatively, it is possible to include, in the packet transmitted by the terminal, information on the basis of which the access network can determine the key used, according to the predefined key generation method. However, given that the number of different possible keys is preferably very high in order to improve the confidentiality of the exchanges, the quantity of information to be included in a packet can be substantial. Yet, in a UNB wireless communication system, the quantity of information that can be included in a packet is highly limited.

OBJECT AND SUMMARY OF THE INVENTION

The present invention has for objective to remedy all or a portion of the limitations of the solutions of prior art, in particular those mentioned hereinabove, by proposing a solution that makes it possible to ensure good confidentiality of the exchanges while still limiting the quantity of information to be included in the packets.

To this effect, and according to a first aspect, the invention relates to a method for transmitting, by means of a transmitter device, of packets to a receiver device of a communication system, comprising, for the transmitting of a packet, referred to as "encrypted packet", including data encrypted according to a symmetric key encryption protocol:

determining the value of an item of generation information, determining an encryption key, to be used to encrypt the data to be included in the encrypted packet to be transmitted, according to the value of the generation information, encrypting the data to be included in the encrypted packet to be transmitted according to the encryption key, calculating a truncated item of information by decomposing the generation information into a first portion and a second portion, the first portion varying more slowly, over the course of time, than the second portion, the truncated information being representative of said second portion of the generation information, calculating a verification code for the encrypted packet according to the encrypted data and the first portion of the generation information, forming the encrypted packet to be transmitted on the basis of the truncated information, the verification code and the encrypted data.

Thus, according to the invention, the encryption key is determined according to the value of an item of generation information that is variable over the course of time. Consequently, the encryption key changes each time that the value of the item of generation information changes, and can have as many different values as the generation information.

However, the generation information is not included as is in the encrypted packet to be transmitted, and it is a truncated item of information that is included in the encrypted packet transmitted. Advantageously, the generation information being decomposed into a first portion and a second portion, the first portion varying more slowly than the second portion, the truncated information is calculated according to the second portion, without taking account of the first portion. Typically, the first portion of the generation information corresponds to a portion which does not vary or varies very little over the transmission duration of several consecutive packets, while the second portion is able to vary from one packet to another.

Consequently, the number of different values that the encryption key can have can be chosen according to the desired level of confidentiality, and this without affecting the quantity of information to be transmitted in the encrypted packet in order to allow the receiver device to determine the encryption key. Indeed, the quantity of information to be transmitted can be limited to the quantity of information required to encode the truncated information.

However, the receiver device must, when an encrypted packet transmitted by the transmitter device is received, estimate the value of the first portion of the generation information of said encrypted packet (not included in said encrypted packet) in order to deduce therefrom, on the basis of the truncated information, the value of the generation information and thus be able to determine the encryption key used by the transmitter device. The verification code, which is calculated by the transmitter device according to the encrypted data and the first portion of the generation information, is then used by the receiver device to determine if the estimated value of the first portion of the generation information is correct, i.e. if it indeed corresponds to the first portion of the generation information used by the transmitter device, by evaluating the integrity of the encrypted packet according to the encrypted data and the estimated value of the first portion of the generation information. If the encrypted packet is considered to be intact, then this furthermore means that the estimated value of the first portion of the generation information indeed corresponds to the first portion of the generation information used by the transmitter device.

In particular embodiments, the method for transmitting can further comprise one or several of the following characteristics, taken separately or according to any possible technical combinations.

In particular embodiments, the verification code is calculated furthermore according to an authentication key of the transmitter device, in such a way that the verification code also makes it possible to verify the authenticity of the encrypted packet.

In particular embodiments, the method for transmitting also comprises forming and transmitting a packet, referred to as "retiming packet", including an item of retiming information representative of the first portion of the generation information. This retiming packet can be transmitted in a recurring manner, for example periodically, or each time that the first portion of the generation information varies, or each time the transmitter device transmits a predetermined number of encrypted packets. During the receiving, by the receiver device, of an encrypted packet transmitted by the transmitter device, the estimating of a candidate value of the first portion of the generation information of said encrypted packet is carried out furthermore according to the retiming information extracted from a previously received retiming packet.

In particular embodiments, the generation information is a packet counter corresponding to the number of packets transmitted by the transmitter device or a generation date of the packet to be transmitted.

According to a second aspect, the present invention relates to a transmitter device for transmitting packets to a receiver device of a communication system, comprising, for the transmitting of a packet, referred to as "encrypted packet", including data encrypted according to a symmetric key encryption protocol:
  means configured to determine the value of a generation information,
  means configured to determine an encryption key, to be used to encrypt the data to be included in the encrypted packet to be transmitted, according to the value of the generation information,
  means configured to encrypt the data to be included in the encrypted packet to be transmitted according to the encryption key,
  means configured to calculate a truncated information by decomposing the generation information into a first portion and a second portion, the first portion varying more slowly, over the course of time, than the second portion, the truncated information being representative of said second portion,
  means configured to calculate a verification code for the encrypted packet according to the encrypted data and the first portion of the generation information,
  means configured to form the encrypted packet to be transmitted on the basis of the truncated information, the verification code, and the encrypted data.

In particular embodiments, the transmitter device can further comprise one or several of the following characteristics, taken separately or according to any possible technical combinations.

In particular embodiments, the verification code is calculated furthermore according to an authentication key of the transmitter device, in such a way that the verification code makes it possible to further verify the authenticity of the encrypted packet.

In particular embodiments, the transmitter device further comprises means configured to form and transmit a packet, referred to as "retiming packet", including a retiming information representative of the first portion of the generation information.

In particular embodiments, the generation information is a packet counter corresponding to the number of packets transmitted by said transmitter device or a generation date of the packet to be transmitted.

According to a third aspect, the present invention relates to a method for extracting, by means of a receiver device, data included in an encrypted packet, referred to as "current encrypted packet", transmitted by means of a transmitter device of a communication system in accordance with a method for transmitting according to any of the embodiments of the invention. Said method for extracting comprises:
  extracting, on the basis of the current encrypted packet, the truncated information, the verification code, and the encrypted data,
  estimating a candidate value for the first portion of the generation information of the emitter device for the current encrypted packet according to the truncated information extracted from said current encrypted packet,
  determining if the estimated candidate value is correct by an evaluation of the integrity of the current encrypted packet according to the estimated candidate value, the encrypted data, and the verification code extracted from said current encrypted packet, when the estimated candidate value is considered to be correct:
  determining an encryption key according to the estimated candidate value and according to the extracted truncated information,
  decrypting extracted encrypted data according to the decryption key.

In particular embodiments, the method for extracting can further comprise one or several of the following characteristics, taken separately or according to any possible technical combinations.

In particular embodiments, the integrity of the current encrypted packet is furthermore evaluated according to an authentication key of the transmitter device.

In particular embodiments, the method for extracting further comprises extracting a retiming information included in a packet transmitted by the emitter device, referred to as "retiming packet". The estimation of the candidate value of the first portion of the generation information for the current encrypted packet is then furthermore carried out according to this retiming information.

In particular embodiments, several candidate values for the first portion of the generation information are estimated, and the integrity of the current encrypted packet is evaluated for each estimated candidate value until a stop criterion is verified.

In particular embodiments, the generation information corresponds to a packet counter of the transmitter device of which the value of the first portion for the current encrypted packet is estimated furthermore according to the value of the first estimated and verified portion for a preceding packet received from the same transmitter device.

In particular embodiments, the generation information corresponds to a generation date of the packet transmitted by the transmitter device of which the value of the first portion is estimated furthermore according to the first portion of the date of reception of said current encrypted packet by the receiver device.

According to a fourth aspect, the present invention relates to a receiver device for receiving packets from a transmitter device of a communication system according to any of the embodiments of the invention. In order to extract the data included in a current encrypted packet, said receiver device comprises:
  means configured to extract, from said current encrypted packet, the truncated information, the verification code and the encrypted data,
  means configured to estimate a candidate value of the first portion of a generation information of the transmitter device for the current encrypted packet according to the truncated information extracted from said current encrypted packet,
  means configured for determining if the estimated candidate value is correct by evaluating the integrity of the current encrypted packet according to the estimated candidate value, the encrypted data, and the verification code extracted from said current encrypted packet,
  means configured to determine a decryption key according to the value of the generation information of the transmitter device estimated for the current encrypted packet,
  means configured for decrypting the encrypted data extracted from the current encrypted packet according to the decryption key.

In particular embodiments, the receiver device can further comprise one or several of the following characteristics, taken separately or according to any possible technical combinations.

In particular embodiments, the integrity of the current encrypted packet is furthermore evaluated according to an authentication key of the transmitter device.

In particular embodiments, the receiver device further comprises means configured to extract the retiming information on the basis of a retiming packet transmitted by the transmitter device. The candidate value of the first portion of the generation information for the current encrypted packet is then estimated furthermore according to this retiming information.

In particular embodiments, several candidate values for the first portion of the generation information are estimated, and the integrity of the current encrypted packet is evaluated for each estimated candidate value until a stop criterion is verified.

In particular embodiments, the generation information corresponds to a packet counter of said transmitter device of which the value of the first portion for the current encrypted packet is estimated furthermore according to the value of the first estimated and verified portion for a preceding packet received from the same transmitter device.

In particular embodiments, the generation information corresponds to a generation date of the packet transmitted by the transmitter device of which the value of the first portion is estimated furthermore according to the first portion of the date of reception of said current encrypted packet by the receiver device.

According to a fifth aspect, the present invention relates to a communication system comprising at least one transmitter device according to any of the embodiments of the invention, and at least one receiver device according to any of the embodiments of the invention.

PRESENTATION OF THE FIGURES

Figure 2:
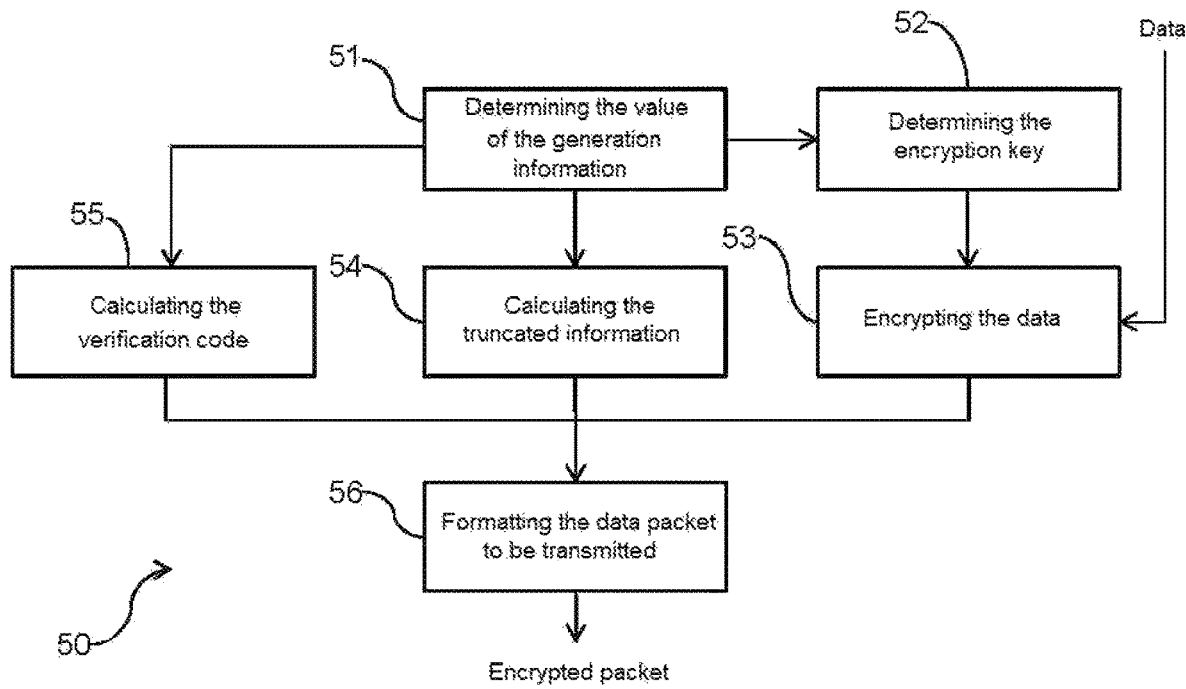
Figure 3:
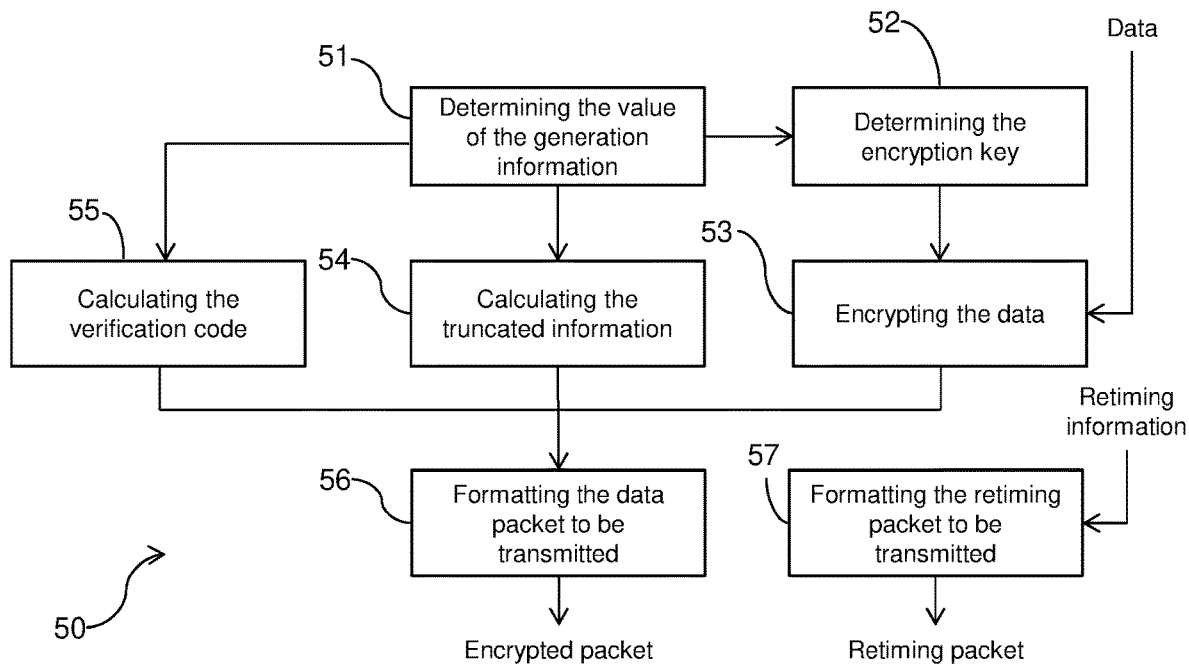
Figure 4:
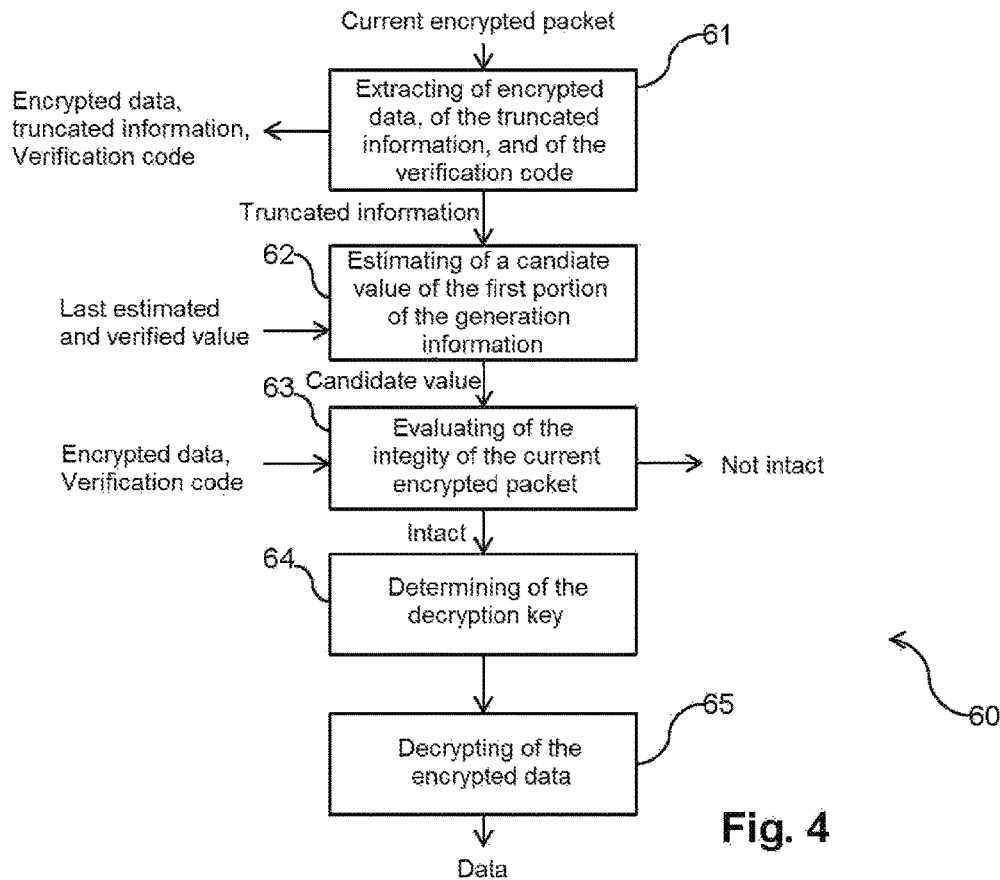
Figure 5:
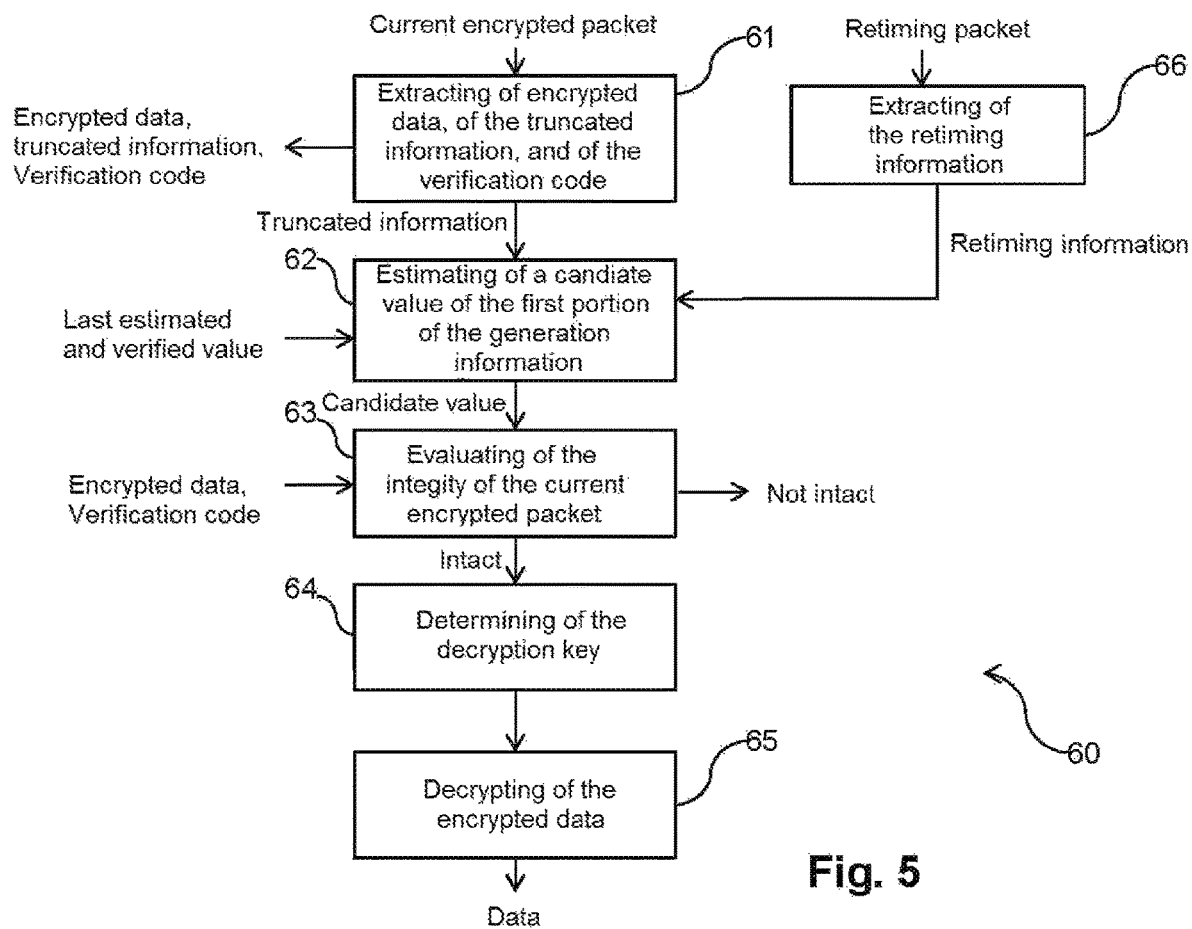
Figure 6:
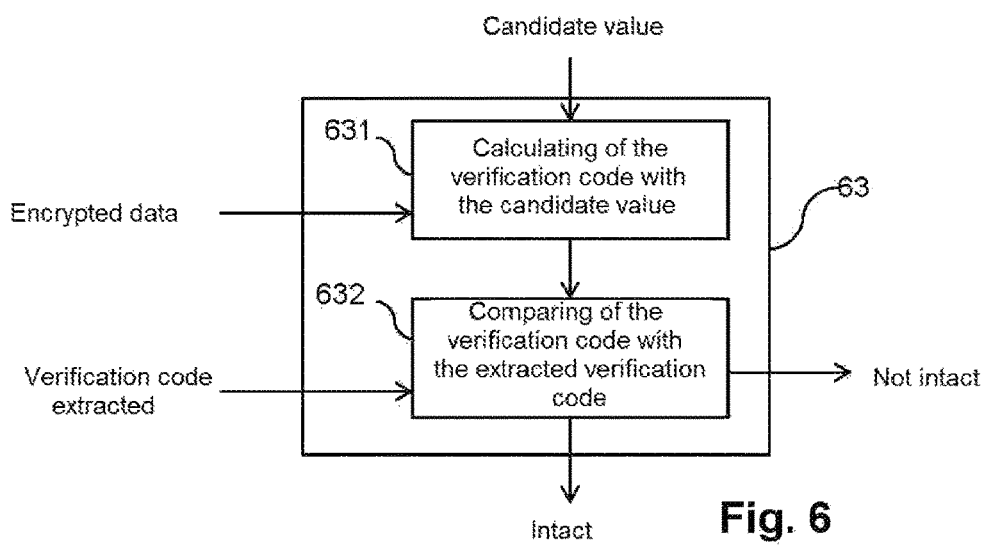
Figure 7:
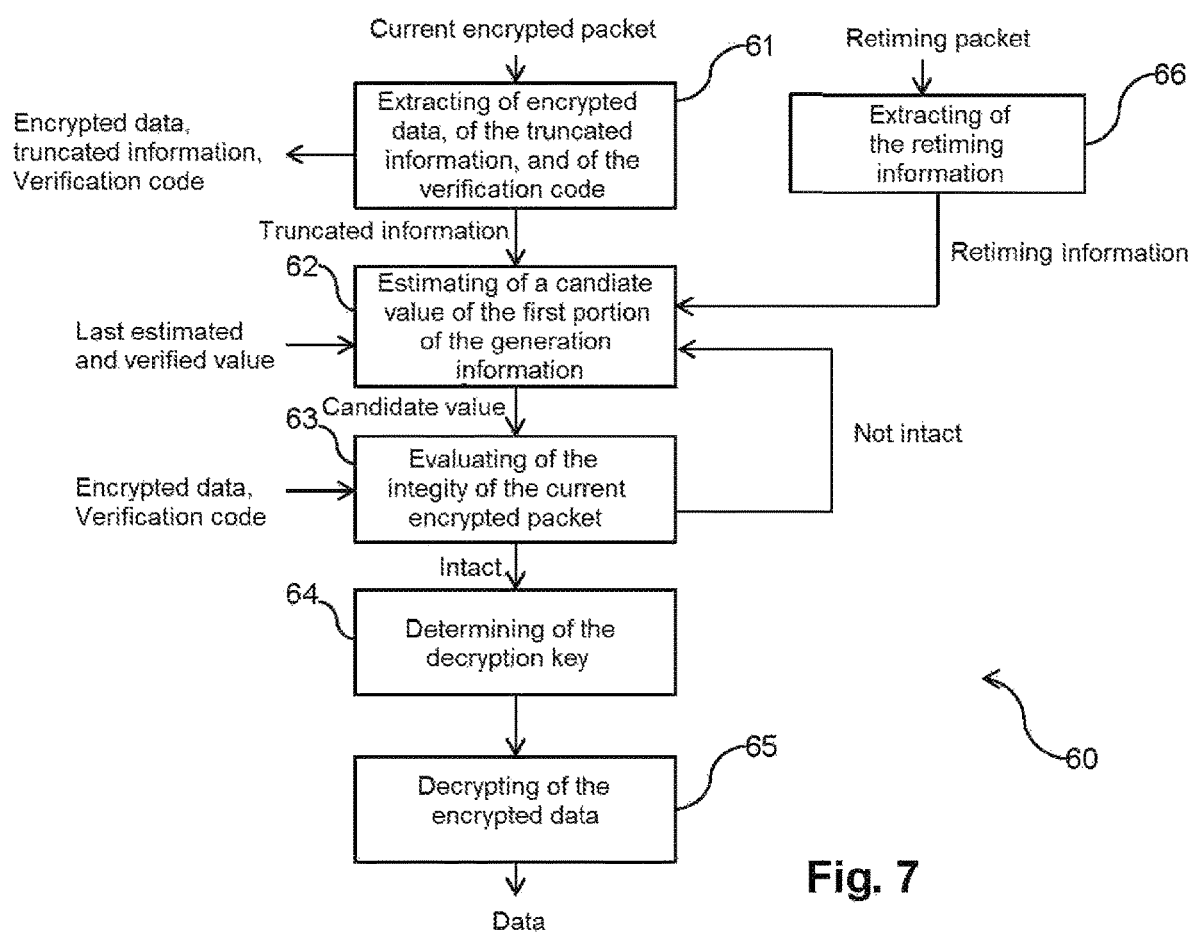

The invention shall be better understood when reading the following description, given as an example that is in no way limiting, and given in reference to the figures which show:

FIG. 1: a diagrammatical representation of a wireless communication system,

FIG. 2: a diagram showing the main steps of a method for transmitting a packet comprising encrypted data, FIG. 3: a diagram showing the main steps of a preferred embodiment of the method for transmitting of FIG. 2, with transmission of a retiming packet, FIG. 4: a diagram showing the main steps of a method for extracting data included in an encrypted packet, FIG. 5: a diagram showing the main steps of a preferred embodiment of the method for extracting of FIG. 4, and highlighting the use of a retiming packet, FIG. 6: a diagram showing the main steps of evaluating the integrity of an encrypted packet, and FIG. 7: a diagram showing the main steps of a preferred embodiment of the method of extracting of FIG. 5 and highlighting the estimating of several candidate values.

In these figures, identical references from one figure to another designate identical or similar elements. For reasons of clarity, the elements shown are not to scale, unless mentioned otherwise.

DETAILED DESCRIPTION OF EMBODIMENTS

FIG. 1 diagrammatically shows a wireless communication system 10, for example of the UNB type, comprising several terminals 20 and an access network 30. In the example shown in FIG. 1, the access network 30 comprises several base stations 31 and a server 32.

The terminals 20 and the base stations 31 of the access network 30 exchange data in the form of radio signals. The term "radio signal" means an electromagnetic wave that propagates via wireless means, of which the frequencies are within the conventional spectrum of radio waves (a few hertz to several hundred gigahertz).

In particular, the terminals 20 are suitable for transmitting packets on an uplink to the access network 30.

The packets are for example transmitted asynchronously. The term "transmitted asynchronously" means that the terminals 20 autonomously determine when the y transmit and/or over which central frequency they transmit, without coordination of said terminals 20 between them and with the base stations 31 of the access network 30.

In the rest of the description, we shall consider in a non-limiting manner the case where the terminals 20 are at least asynchronous in time, in such a way that the packets are transmitted at instants that are not known a priori to the access network 30. Nothing excludes however, according to other examples, considering terminals 20 that are time-synchronised with the base stations 31.

Each base station 31 is adapted to receive the packets from terminals 20 that are within its range. Each packet thus received is for example transmitted to the server 32 of the access network 30, possibly along with other information such as an identifier of the base station 31 that received it, the measured power of said packet received, the measured date of reception of said packet, the measured central frequency of said received packet, etc. The server 32 processes for example all of the packets received from the various base stations 31.

A) Method for Transmitting Packets

FIG. 2 diagrammatically shows the main steps of a method 50 for transmitting, by a terminal 20 and to the access network 30, of packets including data encrypted according to a symmetric key encryption protocol.

For example, the terminal 20 comprises a processing circuit (not shown in the figures), comprising one or several processors and means for memorising (magnetic hard disc, electronic memory, optical disc, etc.) wherein is memorised a computer program product, in the form of a set of program code instructions to be executed in order to implement the various steps of the method 50 for transmitting packets. Alternatively or as a supplement, the processing circuit comprises programmable logic circuit or circuits (FPGA, PLD, etc.), and/or application specific integrated circuit or circuits (ASIC), and/or a set of discrete electronic components, etc., suitable for implementing all or a portion of said steps of the method 50 for transmitting packets.

In other terms, the processing circuit comprises a set of software configured means (specific computer program product) and/or hardware configured means (FPGA, PLD, ASIC, discrete electronic components, etc.) in order to implement the steps of the method 50 of transmitting packets to the access network 30.

The terminal 20 also comprises wireless communication means, considered as known to those skilled in the art, that allow the terminal 20 to transmit packets, to base stations 31 of the access network 30, in the form of radio signals.

Such as shown in FIG. 2, the method 50 for transmitting encrypted packets comprises the following steps, all executed by the terminal 20, which shall be described in detail hereinafter:

51 determining the value of a generation information,
52 determining an encryption key according to the value of the generation information,
53 encrypting data to be included in the encrypted packet to be transmitted according to the encryption key,
54 calculating a truncated information on the basis of the generation information,
55 calculating a verification code for the encrypted packet according to the encrypted data and the first portion of the generation information,
56 forming the encrypted packet to be transmitted on the basis of the truncated information, the verification code and the encrypted data.

Thus, the encryption key is determined according to the value of a generation information that is variable over the course of time. Consequently, the encryption key changes each time that the value of the generation information changes. However, the generation information is not included as is in the encrypted packet to be transmitted, and it is a truncated information that is included in the encrypted packet transmitted.

The generation information can be any information that varies over the course of time that can be decomposed into a first portion and a second portion, the first portion varying more slowly than the second portion. Consequently, the first portion, which does not vary or varies very little over the transmission duration of several consecutive packets, does not have to be included in the encrypted packet to be transmitted. However, the second portion, which varies from one packet to another, is included in the encrypted packet to be transmitted in any suitable form, and the truncated information is calculated on the basis of said second portion only, i.e. without taking account of the first portion.

For example, the generation information is the generation date of the encrypted packet to be transmitted. The generation date is for example expressed in the form year-month-day-hour-minute-second, and can therefore be decomposed into a first portion that varies slowly, such as the portion corresponding to year-month-day, while the second portion, that varies more rapidly, is the portion corresponding to hour-minute-second. The truncated information is therefore, in this example, representative of the portion corresponding to hour-minute-second, and is for example calculated on the basis of the hour-minute-second portion by means of a reversible calculation function and known a priori to the terminal 20 and to the access network 30.

In the rest of the description, we shall consider in a non-limiting manner the case where the generation information is a packet counter that corresponds to the number of packets transmitted by the terminal 20. The truncated information is designated hereinafter by "truncated counter".

A.1) Determination of Value of the Packet Counter

During the step 51 for determining, the terminal 20 updates the value of a packet counter, which corresponds to the number of packets transmitted by said terminal 20.

Preferably, the value of said packet counter is incremented at each new packet transmission. Nothing excludes however, according to other examples, incrementing said value of the packet counter only for certain packets. For example, it is possible, in order to increase the likelihood of receiving, by the access network 30, data included in a packet, to duplicate Nr times said data so as to include it in Nr packets transmitted successively, for example over different central frequencies, all comprising the same data. In such a case, for example, it is possible to increment the value of said packet counter only every Nr packets, i.e. only when new data has to be transmitted by the terminal 20.

In the rest of the description, we shall consider in a non-limiting manner the case where the value of the packet counter is incremented at each new transmission of a packet.

The value of the packet counter is for example incremented modulo Nc, Nc being a predetermined positive whole number. Thus, the packet counter of the terminal 20 can have Nc different values. For example, the number Nc is equal to $2^{Nb1}$, Nb1 being a predetermined positive whole number, in such a way that the value of the packet counter can be encoded by means of Nb1 bits. For example, Nb1 is equal to 128, in such a way that the packet counter of the terminal 20 can have more than $10^{38}$ different values.

A.2) Determination of the Encryption Key

During the step 52 for determining, the encryption key, to be used to encrypt the data to be included in the encrypted packet to be transmitted, is determined according to the value of the packet counter.

Thus, the encryption key to be used is modified each time that the value of the packet counter is incremented. Furthermore, as the packet counter can have Nc different values, this results in that the encryption key can also have Nc different values.

Consequently, the number Nc is advantageously predetermined in such a way as to ensure in particular a good level of confidentiality of the exchanges. For example, by considering the number Nc equal to $2^{Nb1}$ and Nb1 equal to 128, then the encryption key can have more than $10^{38}$ different values, which makes it possible to ensure a good level of confidentiality.

The encryption key is determined, on the basis of the value of the packet counter, according to a predefined key generation method, known a priori to the terminal 20 and to the access network 30. The invention can implement any type of suitable key generation method known to those skilled in the art, and the choice of a particular key generation method forms only an alternative embodiment of the invention. Furthermore, the encryption key can also be determined on the basis of additional information that, where applicable, are for example concatenated with the packet counter in order to obtain a generation word with a size greater than that of the packet counter alone. For example, it can be considered to concatenate with the packet counter a static sequence generated in pseudo-ransom manner, unique for a given terminal 20, and known a priori by the access network 30.

A.3) Encryption of Data

During the step 53 for encrypting, the data to be included in the encrypted packet to be transmitted is encrypted according to the encryption key, according to the symmetrical encryption key protocol considered.

Generally, the invention can be applied to any type of symmetrical encryption key protocol known to those skilled in the art, and the choice of a particular symmetrical encryption key protocol forms only an alternative implementation of the invention.

In preferred embodiments, the symmetrical encryption key protocol used is a stream cipher protocol that is possibly emulated on the basis of a block encryption protocol such as AES (Advanced Encryption Standard).

Indeed, contrary to block encryption protocols, a stream cipher protocol makes it possible to encrypt data regardless of its size in relation to the size of the encryption key. Consequently, it is possible to choose long encryption keys that can as such have a very high number of different values, without having to increase by as much the quantity of data to be included in a packet.

In the rest of the description, we shall consider in a non-limited manner the case of a stream cipher protocol. Conventionally, the data has the form for example of bits, as well as the encryption key that comprises at least Nb1 bits. The encrypted data is for example obtained by combining one-by-one the successive bits of the data and of the encryption key, for example by means of a logic function of the "EXCLUSIVE OR" type (XOR).

A.4) Calculation of the Truncated Counter

During the step 54 of calculating, a truncated counter is determined on the basis of the value of the packet counter of the terminal 20.

To this effect, such as indicated hereinabove, the packet counter is decomposed into a first portion and a second portion.

For example, the second portion of the packet counter corresponds to the value of said packet counter modulo Nt, Nt being a predetermined positive whole number less than Nc. In other terms, the second portion corresponds to the remainder of the Euclidean division of the value of the packet counter by Nt, while the first portion corresponds to the quotient of said Euclidean division of the value of the packet counter by Nt.

For example, the number Nt is equal to $2^{Nb2}$, Nb2 being a predetermined positive whole number less than Nb1, in such a way that the second portion then corresponds to the Nb2 least significant bits (or LSB) among the Nb1 bits of the packet counter. For example, Nb2 is equal to 12, in such a way that the second portion corresponds to the value of the packet counter modulo 4096. The number Nt can for example be chosen in such a way that the likelihood, for the access network 30, to miss Nt consecutive packets transmitted by the same terminal 20 is less than a predefined threshold value, for example less than $10^{-6}$.

The truncated counter is representative of the second portion of the packet counter, and is for example calculated on the basis of said second portion according to a reversible calculation function known a priori to the terminal 20 and to the access network 30. In the rest of the description, we shall consider in a non-limiting manner the case where the truncated counter is chosen equal to the second portion, in such a way that said truncated counter corresponds to the value of the packet counter modulo Nt.

A.5) Calculation of the Verification Code

During the step 55 for calculating, a verification code is determined on the basis of encrypted data and the first portion of the packet counter.

Indeed, the access network 30 must, during the receiving of an encrypted packet transmitted by the terminal 20, estimate the value of the first portion of the packet counter for said encrypted packet in order to deduce therefrom, on the basis of the truncated counter, the value of the generation information, and thus be able to determine the decryption key in order to be able to decrypt the encrypted data contained in said encrypted packet.

The verification code, which is calculated by the terminal 20 according to the encrypted data and the first portion of the packet counter, is then used by the access network 30 to evaluate the integrity of the encrypted packet. If the encrypted packet is considered as intact, then this means that the encrypted data extracted from the encrypted packet and the estimated value of the first portion of the packet counter are correct. Otherwise, this means that the encrypted data extracted from the encrypted packet and/or the estimated value of the first portion of the packet counter are not correct.

Using such a verification code, calculated according to the first portion of the truncated information which is not included in the encrypted packet, therefore makes it possible to verify the value of the first portion of the packet counter estimated by the access network 30, and therefore makes it possible to prevent the case where the encrypted data of an encrypted packet would be decrypted on the basis of an erroneous decryption key due to an error in the estimate of the first portion of the packet counter.

Various more or less robust methods are known to those skilled in the art to verify the integrity of data, such as for example using a parity bit, or a cyclic redundancy check (CRC). In the rest of the description, we shall consider in a non-limiting manner the case where the verification code is a Message Authentication Code (MAC) calculated furthermore according to an authentication key of the terminal 20 which is also known a priori by the access network 30.

It is indeed common, in a communication system, to use a message authentication code to simultaneously verify the authenticity of a packet received and the integrity of the data contained in this packet. In our example, as this code is calculated furthermore according to the first portion of the packet counter, it also makes it possible, without increasing the quantity of information to be included in the encrypted packet, to verify on the access network 30 the estimate of the first portion of the packet counter of a received packet. Thus, such a verification code allows the access network 30:
  to verify the integrity of the encrypted data received;
  to verify the estimated value of the first portion of the packet counter;
  to authenticate the terminal 20 that transmitted the encrypted packet.

A.6) Formation of the Encrypted Packet to be Transmitted

During the step 56 for forming, the encrypted packet to be transmitted is formed on the basis of encrypted data, the verification code, and the truncated counter. In other terms, the value of the packet counter is not included in the encrypted packet to be transmitted, which comprises only the truncated counter.

It is therefore understood that the quantity of information included, in the encrypted packet, in order to encode the truncated counter is less than that required to encode the value of the packet counter, since the truncated counter corresponds for example to the Nb2 least significant bits among the Nb1 bits of the packet counter. Consequently, the (Nb1-Nb2) most significant bits (MSB) of the packet counter, which correspond to the first portion of said packet counter, are not included in the encrypted packet to be transmitted, which corresponds to 116 bits not included in the case where Nb1 is equal to 128 and where Nb2 is equal to 12.

Thus, it is possible to ensure a good level of confidentiality, through the choice of a high Nc value, while still limiting the quantity of information to be included in the encrypted packet, through choosing a Nt value that is significantly less.

The encrypted packet thus formed is then transmitted, by the terminal 20, to the access network 30.

A.7) Alternative Embodiment using a Retiming Packet

FIG. 3 shows the main steps of an alternative embodiment of the method 50 for transmitting comprising, in addition to the steps described hereinabove in reference to the FIG. 2, a step 56 of forming a retiming packet on the basis of a retiming information representative of the first portion of the packet counter.

This retiming packet can be transmitted in a recurring manner, for example periodically, or each time that the value of the first portion of the packet counter varies, or each time that the terminal 20 transmits a predetermined number of encrypted packets, etc.

As shall be explained in more detail in what follows, the retiming information makes it possible, during the receiving of an encrypted packet by the access network 30, to improve the estimate of the value of the first portion of the packet counter.

It is to be noted that the packet counter of the terminal 20 may count only the encrypted packets, just as it may also count all of the packets transmitted, including the retiming packets. This choice of the behaviour of the packet counter forms only an alternative embodiment of the invention.

It is also to be noted that the retiming packet can comprise only retiming information, just as it can also comprise other information, such as for example encrypted data, or the second portion of the packet counter (for example if the packet counter is incremented during the transmitting of a retiming packet).

In the rest of the description, we shall consider in a non-limiting manner the case where;
  the timing information is the first portion of the packet counter, i.e. the (Nb1-Nb2) most significant bits of the packet counter in the example considered,
  a retiming packet is transmitted each time that the counter was incremented Nt times exactly, i.e. each time that the second portion of the packet counter (the Nb2 least significant bits) returns to zero, i.e. also each time that the first portion of the packet counter (the (Nb1-Nb2) most significant bits) is incremented,
  the packet counter of the terminal 20 is incremented during the transmitting of a retiming packet.

In order to allow the access network 30 to discriminate the various types of packets received (encrypted packet, retiming packet, or other), an item of information that makes it possible to identify the type of packet can be included in the packet. This aspect leaves the scope of the invention.

B) Method for Extracting Data Included in the Packet

FIG. 4 diagrammatically shows the main steps of a method 60 for extracting, by the access network 30, of data included in a packet received from a terminal 20, said packet having been transmitted in accordance with a method 50 for transmitting according to one of the embodiments of the invention. In the rest of the description, the encrypted packet on the basis of which it is sought to extract data is designated by "current encrypted packet", in order to distinguish it from other packets previously received from the same terminal 20.

Such as shown in FIG. 4, the method 60 for extracting data comprises the following steps, which shall be described in detail hereinafter:
  61 extracting, on the basis of the current encrypted packet, the truncated information, the verification code, and the encrypted data included in the current encrypted packet,
  62 estimating a candidate value for the first portion of the generation information of the terminal 20 for the current encrypted packet according to the truncated information extracted from the current encrypted packet,
  63 evaluating the integrity of the current encrypted packet according to the estimated candidate value, the encrypted data, and the verification code extracted from said current encrypted packet,
  when the current encrypted packet is considered as intact:
    64 determining a decryption key according to the value of the generation information of the terminal 20 estimated for the current encrypted packet, 65 decrypting the encrypted data extracted from the current encrypted packet according to the decryption key.

It is to be noted that the steps shown in FIG. 4 are all implemented by the access network 30.

In the example described in reference to FIG. 1, wherein the access network 30 comprises a plurality of base stations 31 and a server 32, the current encrypted packet, on the basis of which it is sought to extract the data, is initially received by one or several base stations 31.

Each base station 31 comprises for this purpose means of wireless communication, considered as known to those skilled in the art, that allow said base station to receive packets transmitted by one or several terminals 20 in the form of radio signals.

However, the steps of the method 60 for extracting data, shown in FIG. 4, can be executed by the base station or stations 31 that received the current encrypted packet and/or by the server 32.

In the rest of the description, we shall consider in a non-limiting manner the case where the steps listed hereinabove are all implemented by the server 32, after having received the current encrypted packet from the base station or stations 31 that initially received said current encrypted packet on the uplink.

To this effect, the base stations 31 and the server 32 comprise respective means of network communication, considered as known to those skilled in the art, that allow the base stations 31 to transmit each packet received to the server 32.

The server 32 comprises for example a processing circuit (not shown in the figures), comprising one or several processors and means for memorising (magnetic hard disc, electronic memory, optical disc, etc.) wherein is memorised a computer program product, in the form of a set of program code instructions to be executed in order to implement the various steps of the method 60 for extracting data. Alternatively or as a supplement, the processing circuit comprises programmable logic circuit or circuits (FPGA, PLD, etc.), and/or application specific integrated circuit or circuits (ASIC), and/or a set of discrete electronic components, etc., suitable for implementing all or a portion of said steps of the method 60 for extracting data.

In other terms, the processing circuit comprises a set of software configured means (specific computer program product) and/or hardware configured means (FPGA, PLD, ASIC, discrete electronic components, etc.) in order to implement the steps of the method 60 for extracting data on the basis of the current encrypted packet received from the terminal 20.

Such as indicated hereinabove, different types of generation information can be considered. In the rest of the description, we shall consider in a non-limiting manner the case where the generation information is the packet counter of the terminal 20. We shall furthermore consider the case where the truncated information included by the terminal 20 in the transmitted packet is a truncated counter that corresponds to the value of said packet counter modulo Nt. In other terms, the truncated counter is equal to the second portion of the packet counter of the terminal 20. For the other cases, wherein the truncated counter is not directly equal to the second portion of the packet counter, it is sufficient, to obtain said second portion of the packet counter, to apply on the truncated counter of the current encrypted packet the inverse function of the calculation function used by the terminal 20.

B.1) Extraction of the Truncated Counter, the Verification Code, and the Encrypted Data During the step 61 for extracting, the server 32 extracted from the current encrypted packet the truncated counter, the verification code, and the encrypted data. The extraction of the truncated counter, of the verification code, and of the encrypted data depends on the way in which it was incorporated into the current encrypted packet, and leaves the scope of the invention.

B.2) Estimation a Candidate Value of the First Portion of the Packet Counter

During the step 62 of estimating, the server 32 estimates a candidate value of the first portion of the packet counter of the terminal 20 that transmitted the current encrypted packet.

Indeed, such as indicated hereinabove, the current encrypted packet comprises solely the truncated counter of the terminal 20 that transmitted it, and therefore does not fully comprise the value of the packet counter of said terminal 20, since the truncated counter corresponds solely to the Nb2 least significant bits among the Nb1 bits of the packet counter.

However, given that the encryption key, used by said terminal 20 to encrypt the data included in the current encrypted packet, was determined according to the value of the packet counter of said terminal 20, the server 32 must estimate the value of the first portion of said packet counter of the terminal 20 in order to deduce therefrom the full value of the packet counter, and thus be able to determine in turn the decryption key to be used, which is identical to the encryption key.

In practice, the server 32 can estimate the value of the first portion of the packet counter of the terminal 20 during the transmission of the current encrypted packet, according to:
  the truncated counter extracted from said current encrypted packet and
  the value of the first portion of the packet counter of said terminal 20 estimated and verified for a preceding packets received from the same terminal 20.

The term "preceding packet received" means the last packet received from the terminal 20 before the current encrypted packet, among the packets for which the packet counter of the terminal 20 is incremented, and for which the value of the first portion of the packet counter was able to be estimated and verified. Note that this can therefore be another encrypted packet, or another type of packet such as for example a retiming packet.

Thus, the server 32 memorises the estimated value of the first portion of the packet counter used by the terminal 20 during the transmission of the preceding packet received from said terminal 20, and updates the estimated value of said first portion of the packet counter each time that a new packet is received from said terminal 20. In order to initialise this process, it is for example possible to force the terminal 20 to use a predefined initial value of the first portion of the packet counter during its very first packet transmission, more preferably equal to zero. Where applicable, the server 32 considers, when it receives for the first time a packet transmitted by this terminal 20 (which is not necessarily the first packet transmitted by the terminal 20 if certain packets have been missed by the access network 30), that the estimated value of the first portion of the packet counter for the preceding packet received from the same terminal 20 is equal to said predefined initial value.

On the basis of the value of the first portion of the packet counter estimated for the preceding packet received from the terminal 20, and on the basis of the truncated counter extracted from the current encrypted packet, it is then possible for the server 32 to estimate the value of said packet counter of said terminal 20 for the current encrypted packet.

For example, the value of the first portion of the packet counter of the terminal 20 for the current encrypted packet is estimated according to the following expression:

$$C_1(n)=(C_1(n-1)+k) \text{ modulo } 2^{(Nb1-Nb2)}$$

and the value of the packet counter of the terminal 20 for the current encrypted packet is estimated according to the following expression:

$$C(n)=(C_1(n)\cdot Nt+C_2(n))$$

expressions wherein:
- $C(n)$ corresponds to the value of the packet counter of the terminal 20 estimated for the current encrypted packet,
- $C_1(n)$ corresponds to the first portion of the packet counter for the current encrypted packet,
- $C_2(n)$ corresponds to the truncated counter extracted from the current encrypted packet,
- $C_1(n-1)$ corresponds to the value of the first portion of the packet counter of the terminal 20 estimated and verified for the preceding packet,
- k is a whole number to be determined.

In our example, the value k corresponds to the number of returns to zero of the second portion of the packet counter of the terminal 20 since the preceding packet received. Indeed, the value of the first portion of the packet counter (corresponding to the (Nb1-Nb2) most significant bits of the counter) is incremented each time that the value of the second portion of the packet counter (the truncated portion, corresponding to the Nb2 least significant bits of the counter) returns to zero.

For example, it is possible to systematically consider that the number of packets possibly missed by the access network 30, between the current encrypted packet and the preceding packet received from the same terminal 20, is less than Nt.

In this case, if the truncated counter of the current encrypted packet is greater than the truncated counter of the preceding packet, then the number k is equal to zero (k=0). In order to obtain the estimated value of the packet counter for the current encrypted packet, it is sufficient to replace, in the value of the packet counter estimated for the preceding packet, the Nb2 least significant bits with the Nb2 bits of the truncated counter extracted from the current encrypted packet.

However, if the truncated counter of the current encrypted packet is less than the truncated counter of the preceding packet, then the number k is equal to one (k=1), because there was a return to zero. In order to obtain the estimated value of the packet counter for the current encrypted packet, it is then necessary to replace, in the value of the packet counter estimated for the preceding packet, the Nb2 least significant bits with the Nb2 bits of the truncated counter extracted from the current encrypted packet, but also add one (1) to the (Nb1-Nb2) most significant bits of the value of the packet counter estimated for the preceding packet.

FIG. 5 shows the main steps of an alternative embodiment of the method 60 for extracting data comprising, in addition to the steps described hereinabove in reference to the FIG. 4, a step 66 for extracting, on the basis of a retiming packet, a retiming information representative of the first portion of the packet counter.

Indeed, the estimate of the value of the first portion of the packet counter of a current encrypted packet can be erroneous, in particular in the case where a large number, for example greater than Nt, of consecutive packets were to be missed by the access network. Such an error is all the more serious in that it causes an estimation error for all of the following packets.

It is therefore suitable to correct this situation where the value memorised by the server 32 of an estimated value of the first portion of the packet counter of the terminal 20 is "desynchronised" with the actual value of the first portion of the packet counter of the terminal 20 for a given packet. This is the objective of the retiming packet.

Indeed the retiming information included in the retiming packet is representative of the first portion of the packet counter. It must therefore consequently make it possible to determine with good precision the value of the first portion of the packet counter. At best, and as is the case in the embodiment described, it makes it possible to determine without error the value of the first portion of the packet counter. Generally, the value of the generation information for a current encrypted packet can be estimated by concatenating the first portion of the generation information determined using the retiming information, with the truncated information extracted from the current encrypted packet.

In the embodiment considered, described as a non-limiting example, the retiming information is the first portion of the packet counter, a retiming packet is transmitted each time that the packet counter of the terminal 20 has been incremented Nt times exactly, i.e. each time that the first portion of the counter changes, and the packet counter of the terminal 20 is incremented at each transmission of a retiming packet. It is therefore easy, at the receiving of a retiming packet, to determine the value of the packet counter of the terminal 20 since it corresponds, for its (Nb1-Nb2) most significant bits, to the value of the retiming information, and for its Nb2 least significant bits, to a zero value. Consequently, a retiming packet can play the role of a "previously received packet" for which the value of the packet counter was determined without error.

When a retiming packet is received, a "desynchronisation" can be detected if the value of the first portion of the packet counter estimated for the retiming packet on the basis of a preceding packet is different from the value of the first portion of the packet counter determined on the basis of the retiming information. The system 10 is then resynchronised for the terminal 20 by reinitialising the value of the first portion of the packet counter of the terminal 20 memorised by the server 32 with the value of the retiming information.

B.3) Evaluation of the Integrity of the Current Encrypted Packet

FIG. 6 shows the detail of a preferred embodiment of the step 63 for evaluating the integrity of the current encrypted packet.

Such as shown in FIG. 6, the step 63 comprises a step 631 of calculating a verification code on the basis of the encrypted data and of the estimated candidate value of the first portion of the packet counter. This calculation is carried out according to the same method as that used by the terminal 20 to calculate the verification code at the transmitting of the encrypted packet.

The step 63 then comprises a step 632 of comparing the verification code calculated by the server 32 with the verification code extracted from the current encrypted packet, it is possible to evaluate the integrity of the current encrypted packet. The encrypted packet is considered to be intact only if the verification code extracted from the current encrypted packet and the verification code calculated are identical.

If the current encrypted packet is considered to be intact, then the estimated candidate value of the first portion of the packet counter is deemed to be correct, and the server 32 can execute the step 64 for determining the decryption key, and the step 65 for decrypting encrypted data.

If the current encrypted packet is not considered to be intact, then the estimated candidate value of the first portion of the packet counter is deemed to be incorrect, and it is consequently not possible to determine the decryption key. In this case, the current encrypted packet can for example be simply ignored, or it can possibly be memorised to pass again later through another step of estimating a candidate value of the first portion of the packet counter, for example following the reception of a retiming packet.

In the embodiment considered, described as a non-limiting example, the verification code is a Message Authentication Code (MAC) calculated furthermore according to an authentication key which is known both by the terminal 20 and by the server 32. The server 32 can for example determine the authentication key to be used thanks to an item of information included in the current encrypted packet that makes it possible to uniquely identify the terminal 20 that transmitted the packet. More generally, the determining, by the server 32, of the authentication key to be used can implement any method known to those skilled in the art and leaves the scope of the invention.

In such a case, the verification code makes it possible to simultaneously verify the authenticity of the current encrypted packet, the integrity of the encrypted data contained in this encrypted packet, and also the estimated candidate value of the first portion of the packet counter of the current encrypted packet.

B.4) Determination of the Decryption Key

During the step 64 of determining, the server 32 determines the decryption key to be used to decrypt the encrypted data extracted from the current encrypted packet.

The value of the packet counter of the terminal 20 for the current encrypted packet is deduced on the basis of the estimated and verified candidate value of the first portion, and on the basis of the truncated information. The decryption key is then determined, on the basis of the value of the packet counter of the terminal 20 for the current encrypted packet, according to the same key generation method as that used by the terminal 20 to generate the encryption key. In the absence of errors, the decryption key is therefore identical to the encryption key.

B.5) Decryption of Encrypted Data

During the step 65 of decrypting, the server 32 decrypts the encrypted data extracted from the current encrypted packet, according to the decryption key obtained at the end of the step 64 of determining.

The decryption of the encrypted data depends on the symmetrical encryption key protocol considered, and leaves the scope of the invention. For example, in the case of a stream cipher protocol wherein the encrypted data is obtained by combining one-by-one the successive bits of the data and of the encryption key by means of a logic function of the "OR EXCLUSIVE" type, then the unencrypted data is obtained also by combining one-by-one the successive bits of the encrypted data and the decryption key by means of a logic function of the "OR EXCLUSIVE" type.

B.6) Estimation of Several Candidate Values

FIG. 7 shows the main steps of an alternative embodiment of the method 60 for extracting data comprising, in addition to the steps described hereinabove in reference to the FIG. 5, the estimating and the verifying of several candidate values of the first portion of the packet counter until a stop criterion is verified.

Thus, a set of several candidate values of the first portion of the packet counter of the current encrypted packet is defined, and each estimated candidate value is verified iteratively using the verification code. The stop criterion is for example verified when, for a given candidate value, the integrity of the current encrypted packet is verified, or when all of the candidate values is depleted without any candidate value being able to make it possible to consider the current encrypted packet as intact.

This alternative embodiment makes it possible to overcome the possibility that a large number, for example greater than Nt, of consecutive packets are missed by the access network 30. Indeed, in such a case the estimate of candidate value of the first portion of the packet counter for the current encrypted packet such as it was presented in the section B.3 is false, and it is then advantageous to estimate several candidate values that are different from the first portion of the packet counter, in order to allow for the extraction of the data.

In the embodiment considered, and described by way of a non-limiting example, the variable k introduced in the section B.3 represents, for a current encrypted packet, the number of returns to zero of the second portion of the packet counter of the terminal 20 since the last preceding packet received for which the value of the first portion of the packet counter was able to be estimated and verified.

In order to obtain different candidate values, it is possible to iteratively increment the value of k, by starting with a zero value, and to proceed as such until the integrity of the current encrypted packet is verified for a given candidate value.

The current encrypted packet can however be considered as not being intact following a transmission error that alters the encrypted data (for example due to interference) or if an incorrect authentication key was used. In such a case, it would be regrettable to indefinitely reiterate on candidate values for which the encrypted packet cannot be considered as intact. Also, it is suitable to limit all of the possible candidate values.

To do this, it is for example possible to define the maximum frequency at which the terminal 20 can transmit packets to the access network 30. By memorising the date of reception of the last packet received, and by calculating the maximum number of packets that could have been transmitted by the terminal 20 since this date on the date of reception of the current encrypted packet, it is possible to define the maximum number of returns to zero that the second portion of the packet counter of the terminal 20 could have done during this period of time according to the following expression:

$$k_{max} = E\left[\frac{t(n) - t(n-1)}{Nt} \cdot F_{max}\right]$$

expression in which:
- t(n-1) is the date of reception of the preceding packet,
- t(n) is the date of reception of the current packet,
- $F_{max}$ is the maximum frequency for transmitting packets,
- E[x] corresponds to the integer portion of x,
- $k_{max}$ is the maximum number of returns to zero of the second portion of the packet counter of the terminal 20 during the period of time between t(n-1) and t(n).

The set of candidate values of the first portion of the packet counter to be considered is then defined by:

$C_1(n) = (C_1(n-1) + k)$ modulo $2^{(Nb1-Nb2)}$, with k varying between 0 and $k_{max}$.

It is however understood that there are other methods for defining a set of candidate values of the first portion of the packet counter. In particular, it is for example possible to estimate the most likely value of the first portion of the packet counter according to an average time of packet transmission by the terminal 20. Other candidate values can then be defined on the basis of the most likely value, and verified iteratively in decreasing order of likelihood. The choice of a particular method forms only an alternative implementation of the invention.

Indeed, although, in the example considered here in a non-limiting way, the terminals 20 transmit their packets asynchronously, said terminals 20 can however transmit their packets with a certain regularity. For example, a terminal 20 can transmit a predetermined number of packets per day, without however transmitting said packets in a strictly periodical manner. In such a case, said packets are nevertheless transmitted, on the average, in a substantially periodical manner. In such a case, in particular, it is advantageous to estimate the average transmission period between the transmissions of consecutive packets by said terminal 20, as the latter can make it possible to improve the estimate of the value of the first portion of the packet counter.

For example, the average transmission period of said terminal 20 is calculated according to the following expression:

$$Tem = \frac{1}{M-1} \cdot \sum_{m=2}^{M} \frac{t(m) - t(m-1)}{C(m) - C(m-1)}$$

expression in which:
Tem corresponds to the average transmission period estimated for the terminal 20,
C(m) corresponds to the value of the packet counter of the terminal 20 estimated for the packet of rank m received from said terminal 20,
t(m) corresponds to the date of reception measured for the packet of rank m received from said terminal 20,
C(m-1) corresponds to the value of the packet counter of the terminal 20 estimated for the packet of rank (m-1) received from said terminal 20,
t(m-1) corresponds to the date of reception measured for the packet of rank (m-1) received from said terminal 20,
M corresponds to the total number of packets received from said terminal 20.

Once the average transmission period of the terminal 20 is estimated, the value noted as $k_{prob}$ that is the most likely for calculating the first portion of the packet counter for the current encrypted packet is for example estimated according to the following expression:

$$k_{prob} = E\left[\frac{t(n) - t(n-1)}{Tem \cdot Nt}\right] + p$$

expression in which (t(n)-t(n-1)) corresponds to the time elapsed between the date of reception of the current encrypted packet and the date of reception of the preceding packet, and p is a whole number that is determined as follows:

p=0 if $C_2(n) > C_2(n-1)$, p=1 if $C_2(n) < C_2(n-1)$.

The candidate values to be iterated can then be, for example, defined by the set:

$k = k_{prob} \pm i$, $i \in \mathbb{N}$, $k \geq 0$, $k \leq k_{prob} + k_{max}$ B.7) Other Type of Generation Information In the embodiments of the method 60 for extracting described hereinabove, the case where the generation information is the packet counter of the terminal 20 was considered in a non-limiting manner.

However, such as indicated hereinabove, other types of generation information can be considered, and the choice of a particular type of generation information, variable over the course of time, forms only an alternative embodiment of the invention.

It is also understood that the estimate of the value of the first portion of the generation information of the terminal 20 for the current encrypted packet can depend on the type of generation information considered.

For example, in the case where the generation information corresponds to the packet counter of the terminal 20, the estimate of the first portion of the value of said packet counter of the terminal 20 for the current encrypted packet advantageously takes account of the value of the first portion of said packet counter estimated for the preceding packet received from the same terminal 20.

In the case where the generation information considered corresponds to the date of generation, by the terminal 20, of the packet to be transmitted, then it is not necessary to take account of the value of the first portion of the date of generation estimated for the preceding packet received from the same terminal 20, and the value of the first portion of the date of generation of the current encrypted packet by the terminal 20 is for example estimated according to the date of reception of said current encrypted packet. Indeed, the date of generation of the current encrypted packet by the terminal 20 and the date of reception of said current encrypted packet by the access network 30 have in principle respective first portions that are substantially identical, and differ mainly by their respective second portions. Given that the truncated information extracted from the current encrypted packet is representative of the second portion of the date of generation of said current encrypted packet by the terminal 20, it is understood that it is possible to estimate the value of the date of generation of said current encrypted packet according to the truncated information extracted from said current encrypted packet and according to the date of reception of said current encrypted packet by the access network 30. For example, the value of the date of generation of the current encrypted packet is obtained by combining the first portion of the date of reception of the current encrypted packet with the second portion of the date of generation determined on the basis of the truncated information extracted from said current encrypted packet.

Using a date of generation of the packet as generation information suppose however that the current dates of the terminal 20 and of the access network 30 are synchronised with sufficient precision.

More generally, note that the embodiments considered hereinabove were described by way of non-limiting examples, and that other alternatives can consequently be considered.

In particular, the invention was described as considering solely packets transmitted on the uplink, from the terminals 20 to the access network 30. The invention can however be applied, alternatively or as a supplement, over a downlink from the access network 30 to the terminals 20. In other terms, the invention can be applied more generally to the transmitting, by means of a transmitter device, of a packet comprising encrypted data and to the extracting, by a receiver device, of the data included in such a packet.

Furthermore, the invention was described by considering a UNB wireless communication system 10. Nothing excludes however, according to other examples, considering other types of communication systems, including wired communication systems. The invention however has a particularly advantageous application in low-speed wireless communication systems, i.e. with a speed of less than 1 kilobit/s.

The invention claimed is:

1. A method for transmitting, by a transmitter, of encrypted packets to a receiver of a communication system, an encrypted packet comprises data encrypted by a processor the transmitter according to a symmetric key encryption protocol by:
   determining a value of a generation information, wherein the generation information is a packet counter corresponding to a number of packets transmitted by the transmitter or a generation date of the encrypted packet to be transmitted;
   determining an encryption key, to be used to encrypt the data to be included in the encrypted packet to be transmitted, according to the value of the generation information;
   encrypting the data to be included in the encrypted packet to be transmitted according to the encryption key;
   calculating a truncated information by decomposing the generation information into a first portion and a second portion, the first portion varying more slowly, over a course of time, than the second portion, the truncated information being representative of the second portion of the generation information;
   calculating a verification code for the encrypted packet according to the encrypted data and the first portion of the generation information; and
   forming the encrypted packet to be transmitted based on the truncated information, the verification code and the encrypted data, the encrypted packet to be transmitted does not include the first portion of the generation information.

2. The method according to claim 1, wherein the verification code is calculated furthermore according to an authentication key of the transmitter.

3. The method according to claim 1, further comprising forming and transmitting a retiming packet, the retiming packet comprising a retiming information representative of the first portion of the generation information.

4. A method for extracting, by a processor of a receiver, data included in a current encrypted packet transmitted by a transmitter in accordance with the transmitting method of claim 1, comprising:
   extracting, from the current encrypted packet, truncated information, the verification code and encrypted data;
   estimating, according to the extracted truncated information, a candidate value for the first portion of the generation information of the transmitter for the current encrypted packet;
   verifying a correctness of the estimated candidate value by evaluating an integrity of the current encrypted packet according to the estimated candidate value, the encrypted data, and the verification code extracted from the current encrypted packet; and
   in response to the verification that the estimated candidate value is correct, determining a decryption key based on the estimated candidate value and the extracted truncated information, and decrypting extracted encrypted data according to the decryption key.

5. The method according to claim 4, wherein the integrity of the current encrypted packet is furthermore evaluated according to an authentication key of the transmitter.

6. The method according to claim 4, further comprising extracting, by the processor of the receiver, a retiming information included in a retiming packet transmitted by the transmitter, the candidate value of the first portion of the generation information of the current encrypted packet being estimated furthermore according to the retiming information extracted from the retiming packet.

7. The method according to claim 4, wherein several candidate values for the first portion of the generation information are estimated; and wherein the integrity of the current encrypted packet is evaluated for each estimated candidate value until a stop criterion is verified.

8. The method according to claim 4, wherein the generation information is a packet counter of the transmitter; and wherein the candidate value of the first portion of the generation information for the current encrypted packet is estimated furthermore according to an estimated candidate value of the first portion of the generation information verified for a preceding packet received from a same transmitter.

9. The method according to claim 4 wherein the generation information corresponds to a generation date of the packet transmitted by the transmitter; and wherein the candidate value of the first portion of the generation information for the current encrypted packet is estimated and verified furthermore according to the first portion of a reception date of the current encrypted packet by the receiver.

10. A transmitter comprising one or more processors configured to implement the method according to claim 1.

11. A receiver comprising one or more processors configured to implement the method according to claim 4.

12. A communication system comprising at least one transmitter and at least one receiver, the transmitter configured to transmit encrypted packets to the receiver, the encrypted packet comprising data encrypted according to a symmetric key encryption protocol, the transmitter comprising a processor configured to:
   determine a value of a generation information, wherein the generation information is a packet counter corresponding to a number of packets transmitted by the transmitter or a generation date of the packet to be transmitted;
   determine an encryption key, to be used to encrypt the data to be included in the encrypted packet to be transmitted, according to the value of the generation information;
   encrypt the data to be included in the encrypted packet to be transmitted according to the encryption key;
   calculate a truncated information by decomposing the generation information into a first portion and a second portion, the first portion varying more slowly, over the course of time, than the second portion, the truncated information being representative of the second portion;
   calculate a verification code for the encrypted packet according to the encrypted data and the first portion of the generation information; and
   form the encrypted packet to be transmitted based on the truncated information, the verification code, and the encrypted data, the encrypted packet to be transmitted does not include the first portion of the generation information.

13. The system according to claim 12, wherein the verification code is calculated furthermore according to an authentication key of the transmitter.

14. The system according to claim 12, wherein the processor of the transmitter is configured to form and transmit a retiming packet, the retiming packet comprising a retiming information representative of the first portion of the generation information.

15. The system according to claim 12, the receiver configured to receive and extract data included in a current encrypted packet transmitted by the transmitter, the receiver comprising a processor a processor configured to:
- extract, from the current encrypted packet, the truncated information, the verification code and the encrypted data;
- estimate a candidate value for the first portion of the generation information of the transmitter for the current encrypted packet according to the extracted truncated information;
- verify a correctness of the estimated candidate value by evaluating an integrity of the current encrypted packet according to the estimated candidate value, the encrypted data, and the verification code extracted from the current encrypted packet; and
- in response to the verification that the estimated candidate value is correct, determine a decryption key based on the estimated candidate value and the extracted truncated information, and decrypt the encrypted data extracted from the current encrypted packet according to the decryption key.

16. The system according to claim 15, wherein the integrity of the current encrypted packet is furthermore evaluated according to an authentication key of the transmitter.

17. The system according to claim 15, wherein the processor of the receiver is configured to extract a retiming information included in a retiming packet transmitted by the transmitter, the candidate value of the first portion of the generation information of the current encrypted packet being estimated furthermore according to the retiming information extracted from the retiming packet.

18. The system according to claim 15, wherein several candidate for the first portion of the generation information are estimated by the processor of the receiver and wherein the integrity of the current encrypted packet is evaluated for each estimated candidate value until a stop criterion is verified.

19. The system according to claim 15, wherein the generation information is a packet counter of the transmitter; and wherein the candidate value of the first portion of the generation information for the current encrypted packet is estimated furthermore according to an estimated candidate value of the first portion of the generation information verified for a preceding packet received from a same transmitter.

20. The system according to claim 15, wherein the generation information corresponds to a generation date of the packet transmitted by the transmitter; and wherein the candidate value of the first portion of the generation information for the current encrypted packet is estimated and verified furthermore according to the first portion of a reception date of the current encrypted packet by the receiver.

* * * * *